3,213,141
CATALYTIC REDUCTION OF AROMATIC
DINITRO COMPOUNDS
David E. Graham, Westfield, N.J., and Harlan B. Freyermuth and Eugene V. Hort, Easton, Pa., assignors to General Aniline & Film Corporation, New York, N.Y., a corporation of Delaware
Filed July 6, 1959, Ser. No. 825,068
9 Claims. (Cl. 260—580)

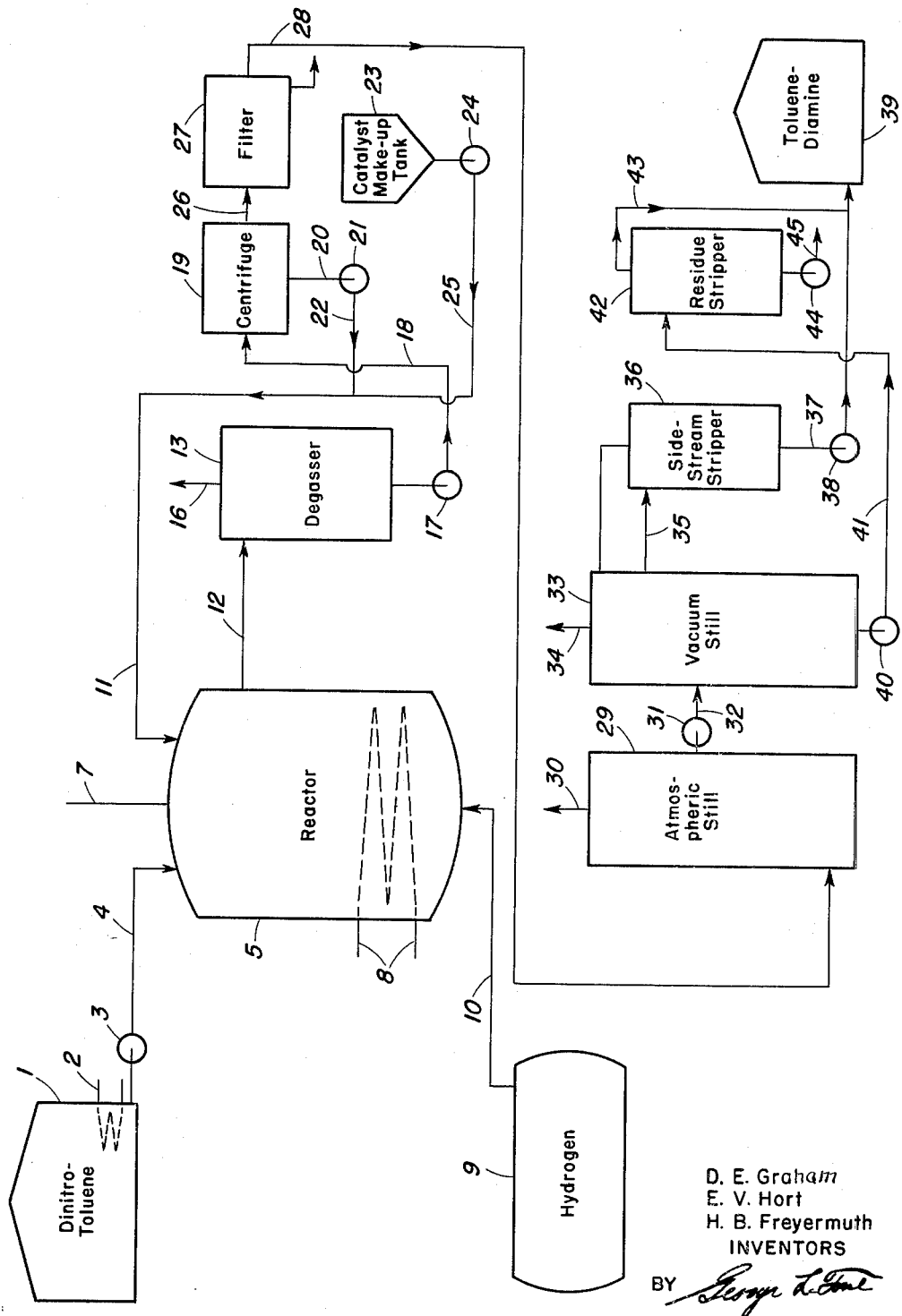

This invention relates to an improved method of catalytic hydrogenation of aromatic dinitro compounds, more particularly dinitrobenzenes and dinitrotoluenes to reduce them to the corresponding diamino compounds, and is particularly concerned with an improved process whereby this reduction is carried out in liquid phase and under safe conditions with a high conversion.

In the co-pending application of David E. Graham, Serial No. 563,411, filed February 6, 1956 now Patent No. 2,894,036 issued July 7, 1959, there is described an improved process for the catalytic hydrogenation of aromatic polynitro compounds to form the polyamine compounds, in which the catalytic reduction of the nitro compound to be reduced is effected in solution in a solvent which is a solvent for the nitro compound to be reduced, and for the amino compound and water formed in the hydrogenation so that there is present in the reaction zone throughout the hydrogenation, a single liquid phase. Included in the inert solvents which may be employed in said application, there are aqueous solutions of the amino compound which is formed in the reduction.

The present invention is concerned with certain improvements and modifications of the process of said copending application, and in accordance with the present invention, the dinitro aromatic compound to be reduced is liquified and introduced into a hydrogenation reactor containing the aromatic diamine and water formed on reduction and catalyst and hydrogen for the reduction. The contents of the hydrogenation reactor will agitate so that as the dinitro compound to be reduced is introduced thereinto, it is immediately dissolved in the solution of diamine and water formed by the reduction, and the rate of introduction of the dinitro compound is controlled so that the amount of dinitro compound in the reactor is less than the amount which will form a separate phase in the reactor. By this means, a single liquid phase of dinitro compound to be reduced, amine obtained by reduction and water is maintained in the reactor so that the reduction proceeds smoothly and safely.

The aromatic dinitro compounds may be handled safely in concentrated or pure form at temperatures of up to 100° C. or even slightly higher. However, in the presence of hydrogen and hydrogenation catalyst, there is a possibility that the aromatic dinitro compounds in concentrated form become potentially explosive, and explosions or uncontrolled reactions have been encountered when it is attempted to directly hydrogenate undiluted aromatic dinitro compounds with gaseous hydrogen and using a hydrogenation catalyst. However, in practicing the present invention, the hydrogen and hydrogenation catalyst are contained in the diamine and water formed in the reaction so that pure dinitro compound can be introduced into such an agitated mixture and is dissolved in the amine and water, and only when so dissolved and thus diluted, does it come in contact with the hydrogen and catalyst. As a result, the hydrogenation is effected with the aromatic dinitro compound to be reduced dissolved in the diamine and water formed in the reduction so that the reduction proceeds with safety.

The details of the present invention will be apparent from the following detailed description of the preferred method of practicing the same, reference being made to the accompanying drawings in which the single figure is a diagrammatic flow chart of the preferred form of apparatus for practicing this invention. For convenience, the present invention will be described in relation to its use in reduction of dinitrotoluene, although as will be pointed out later, other aromatic dinitro compounds can be reduced to the corresponding diamines with equal facility.

Dinitrotoluene from storage tank 1 in which it is maintained in liquid phase by heating coil 2 is withdrawn from tank 1 by pump 3 and passed through valve line 4 into hydrogenation reactor 5. In one form of apparatus, this reactor 5 was a closed kettle of 3,000 gallons capacity and was provided with agitating stirrer (not shown) on rotating shaft 7 so that good agitation of the contents of the kettle was maintained throughout the reaction. The kettle was also provided with coils 8, for circulation of water or other heat exchange fluid, to control the temperature of the contents of the kettle. The dinitrotoluene in tank 1 was at a temperature of 66° C. and was introduced into the reactor 5 at the rate of 1900 pounds per hour. The contents of reactor 5 were maintained at 80° C. and hydrogen pressure of 75 p.s.i.g. Hydrogen from pressure storage tank 9 is introduced into reactor 5, at a point remote from the introduction of the dinitrotoluene, through valved line 10 at the rate of 138 pounds per hour.

A slurry of a 5% palladium on charcoal hydrogenation catalyst in a solution of toluenediamine and water having a composition essentially that of the solution of toluene diamine and water formed in the reduction was also introduced into the reactor through valved line 11. The reactor was of such size that at these rates of feed, there was approximately a 10 hour average residence time in the reactor. A total of 2167 pounds per hour of product was continuously withdrawn from the reactor through valved line 12. This product consisted of 1279.8 pounds toluenediamine 797.5 pounds water, 10.2 pounds catalyst, 13.8 pounds of hydrogen, each per hour, along with 65.6 pounds of other material, largely mononitromonoaminotoluene, and possibly traces of unconverted dinitrotoluene per hour, and was introduced into degassing tank 13, maintained at substantially atmospheric pressure and, with agitating and heating means (not shown). 13.8 pounds per hour of hydrogen were removed from the degassing tank and vented through valved line 16. The toluenediamine, water, catalyst, etc. was withdrawn from degassing tank 13 by pump 17 and introduced into, through valved line 18, catalyst separating centrifuge 19, where there was separated 51.1 pounds of catalyst slurry per hour. This slurry consisted of 8.7 pounds 5% palladium catalyst on charcoal, 25.3 pounds toluenediamine, 15.8 pounds water and 1.3 pounds other materials, each per hour. The slurry removed from the centrifuge through valved line 20 was returned by pump 21 through valved line 22 to valved line 11, by which it was returned to the reactor. 1.52 pounds per hour of fresh catalyst in 44.5 pounds toluenediamine, 27.7 pounds water and 2.3 pounds other material were also introduced from stirred catalyst make-up tank 23 by pump 24 through valved line 25 and valved line 11 into the reactor 5 The toluenediamine and water flow from centrifuge 19 through valved line 26 to filter 27 by means of which any catalyst not removed from the centrifuge was separated, and approximately 1.5 pounds catalyst per hour was separated in filter 27 and thus removed from the system. From filter 27, the toluenediamine and water flowed through valved line 28 to dehydration still 29 operated at atmospheric pressure. A total of 739 pounds per hour of water and 10 pounds per hour of toluenediamine were removed overhead from the atmospheric dehydration still 29 through valved line 30 and removed from the system. Substantially dehydrated toluenediamine was removed from atmospheric dehydration still 29 by pump 31 through valved line 32 to valuum dehydration still 33. Approximately, 1204 pounds per hour of toluenediamine, 20 pounds per hour of water and 72 pounds per hour other material, a total of 1296 pounds per hour, was introduced into vacuum dehydration still 33 through valved line 32. Approximately 15 pounds per hour of water were removed overhead from vacuum dehydration still 33 through valved line 34 and removed from the system. Toluenediamine was removed as an overhead side stream from vacuum dehydration still 33 through valved line 35 and introduced therethrough into side stream stripper 36 from which 1148 pounds per hour of dehydrated toluenediamine were removed through valved line 37 by pump 38 and introduced into toluenediamine storage tank 39. A total of 134 pounds per hour of residue were withdrawn from the pump by vacuum dehydration still 33 by pump 40 through valved line 41. This material consisted of 31 pounds per hour of toluenediamine and 103 pounds of other material which are introduced through valved line 41 into residue stripper still 42 from which 20 pounds per hour of toluenediamine were removed overhead through valve line 43 and return to storage tank 39. 114 pounds per hour of tars and other materials were removed from the bottom of residue stripper 42 by pump 44 and removed from the system through valved line 45.

In atmospheric dehydration still 29, the temperature at the top of the column was 100° C. and at the bottom 180° C., reflux ratio of 1:2 was maintained. In vacuum dehydration still 33 the temperature at the top of the still was 100° C. and the absolute pressure 10 mm., at the bottom of the still 180° C. and the absolute pressure 30 mm. In side stream stripper 36 the temperature at the top was 120° C. and at the bottom 175° C. and the absolute pressure 25 mm. In side stream stripper 42 the temperature of the vapors removed overhead was 155° C., and the absolute pressure 20 mm., and the residue removed from the bottom was 250° C. and absolute pressure 30 mm.

In operating the foregoing process, the same results were obtained regardless of the particular dinitrotoluene being reduced and diaminotoluene being produced. Thus, the process has been operated employing both 2,4-dinitrotoluene and 2,6-dinitrotoluene and various mixtures of these isomers, such as a mixture of 78% by weight of 2,4-dinitrotoluene, 18% by weight of 2,6-dinitrotoluene and 4% by weight of other isomeric dinitrotoluenes.

It will also be apparent that in place of dinitrotoluenes, the process of the present invention may be applied to the reduction of dinitrobenzenes, e.g. ortho-, meta- or para-dinitrobenzenes or mixtures of these isomers to the corresponding diaminobenzenes. It may also be applied to the reduction of such aromatic dinitrocompounds as di-nitroethylbenzenes, e.g., those produced by the nitration of ortho-nitrobenzene and consisting essentially of isomeric M-dinitroethylbenzenes.

While 5% palladium on charcoal hydrogenation catalyst is a preferred hydrogenation catalyst, other catalysts, particularly nickel and the platinum metals' group of the Periodic System, either supported on carriers or unsupported, may be employed, if desired. Other catalysts which have been employed with good results are reduced and stabilized nickel on kieselguhr catalyst sold by Harshaw Chemical Co. as Ni 0104T18, a 0.3% palladium on silica gel catalyst, a 0.5% palladium on alumina catalyst, Raney nickel catalyst. Suitable methods for the preparation of specific catalysts for use in the present invention are known in the art, and some of the useful catalysts which may be employed, together with reference to their preparation are as follows:

Platinum black—Sabatier-Reid, Catalysis in Organic Chemistry. D. Van Nostrand Co., New York, 1922

Platinum oxide—Adams, Voorhees and Shriner, Organic Syntheses, Coll. vol. 1, p. 452, John Wiley & Sons, New York, 1932

Raney nickel—Covert, J. Am. Chem. Soc. 54, 4116 (1952)

Palladium on charcoal—Mannich & Thiele, Ber. Deutches Pharm. Ges. 26, 36–48 (1916)

Platinum on charcoal—Ellis, U.S. Patent 1,174,245

Nickel on kieselguhr—Covert and Conner, J. Am. Chem. Soc. 54,165 (1932)

Platinum or palladium on alumina—Schwarcman, U.S. Patent 1,111,502.

It will also be apparent that the specific conditions of operation, e.g., temperature and pressure, may be varied from the preferred conditions given in the foregoing detailed description of the present invention, and that the conditions of temperature and pressure known in the art for the reduction of aromatic dinitro compounds may be employed, e.g., temperatures of from 20° C. to 100° C. or slightly higher. Lower temperatures are less desirable since the reaction becomes excessively slow, and above 100° C. undesired reactions, such as hydrogenolysis, ring hydrogenation and polymerization may take place. Optimum temperatures and pressures of reaction may be obtained for each specific dinitro compound, and the particular catalyst employed. However, in general, it has been found that satisfactory reaction rate is obtained within the range of 40 to 100° C. At 100° C. some decomposition of the diamine may take place, although this usually does not become serious or hazardous until temperatures above 100° C. are reached. The pressure employed for the reaction is preferably within the range of 25 to 80 pounds per square inch guage, although pressures from atmospheric to about 150 pounds per square inch guage may be employed, if desired.

It will be understood that the apparatus employed in the foregoing description is a preferred form of apparatus, but that various changes may be made therein. In particular, the method of recovering and purifying the diamine may be modified, and alternative systems known in the art may be used. Also, it will be understood that in place of one large reactor, several small reactors in parallel may be employed. Or if desired, two or more reactors in series may be employed so that most of the reduction is accomplished, for example, in the first reactor, and final complete reduction effected in a second reactor. In operating the present process, it has been found that the rate of feed of the dinitro compound into the diamine and water formed on reduction in the reactor is at such a rate that a residence time of from 5 to 20 hours is maintained in the reactor giving essentially complete reduction. In any event, the rate of introduction of dinitro compound into the reactor is controlled so that the product withdrawn therefrom is essentially free of any unreduced dinitro compound. When operating as described in detail above, the dinitro compound is dissolved essentially instantaneously in the diamine and water in the reactor with good agitation. No unreacted dinitro compound is detected in the reactor or in the stream removed therefrom. The rate of introduction of the dinitro compound should be such that normally only a fraction of a percent of dinitro compound is present in the reactor and at most not over 2% unreduced dinitro compound is present in the reactor or in the stream removed therefrom.

We claim:

1. In a process for the catalytic hydrogen reduction of aromatic dinitro compounds of the benzene series to the corresponding aromatic diamines, wherein an aromatic dinitro compound and hydrogen are introduced into a hydrogenation zone and therein reacted in the presence of a hydrogenation catalyst selected from the group consisting of nickel and the platinum group of metals to thereby form water and the aromatic diamine corresponding to the aromatic dinitro compound introduced; the improvement of maintaining in said reaction zone an agitated body of the water and diamine formed by the reduction and having said hydrogenation catalyst suspended therein, continuously introducing a stream of the aromatic dinitro compound to be reduced and a stream of hydrogen into said body of said solution of aromatic diamine and water, continuously withdrawing from said reaction zone a stream of said solution of the aromatic diamine and the water formed by reduction equivalent to the amount of said aromatic dinitro compound introduced into said zone, and controlling the rate of introduction of said aromatic dinitro compound into said zone such that said aromatic dinitro compound is soluble in said solution of aromatic diamine and water and that the stream removed therefrom is essentially free of unreduced dinitro compound.

2. The process as defined in claim 1 wherein aromatic dinitro compound specified is selected from the group consisting of dinitrobenzene and dinitrotoluene.

3. The process as defined in claim 2 wherein the reaction zone is maintained at a temperature within the range of about 20° C. to 150° C.

4. The process as defined in claim 3 wherein the reaction zone is maintained under a hydrogen pressure within the range of about 15 to 150 pounds per square inch gauge.

5. The process as defined in claim 4 wherein the reaction zone is maintained at a temperature within the range of about 40° to 100° C.

6. The process as defined in claim 1 wherein the aromatic dinitro compound specified is dinitro toluene.

7. The process as defined in claim 6 wherein the reaction zone is maintained at a temperature within the range of about 20° to 150° C.

8. The process as defined in claim 7 wherein the reaction zone is maintained under a hydrogen pressure within the range of about 15 to 150 pounds per square inch gauge.

9. The process as defined in claim 8 wherein the reaction zone is maintained at a temperature within the range of about 40° to 100° C.

References Cited by the Examiner

UNITED STATES PATENTS

| 2,458,214 | 1/47 | Souders | 260—580 |
| 2,619,503 | 11/52 | Benner et al. | 260—580 |
| 2,894,036 | 7/59 | Graham | 260—580 |

FOREIGN PATENTS

| 786,407 | 11/57 | Great Britain. |

CHARLES B. PARKER, *Primary Examiner.*

LEON ZITVER, *Examiner.*